(No Model.)
J. M. WEST.
CULINARY APPARATUS.
No. 600,818. Patented Mar. 15, 1898.
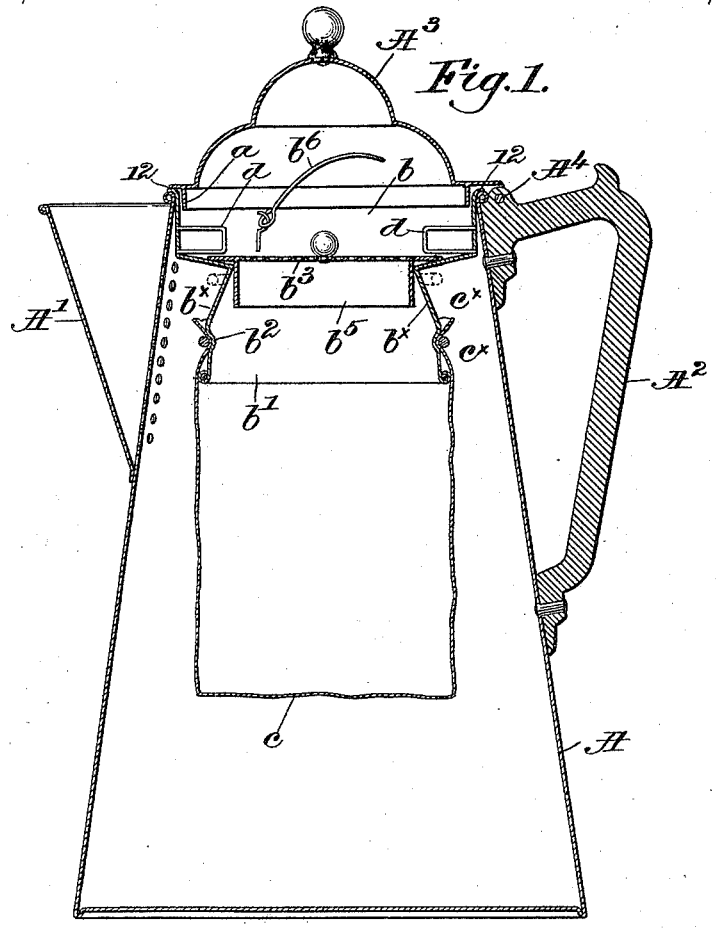
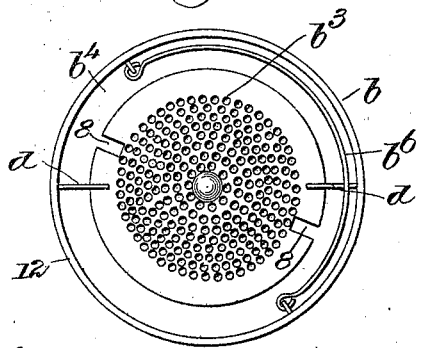
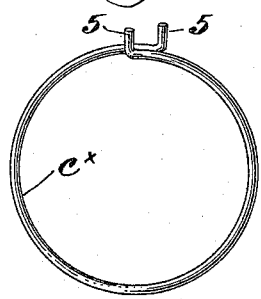
Witnesses:
A. C. Hammon,
Thomas J. Drummond.
Inventor:
John M. West.
by Crosby & Gregory,
attys.
THE NORRIS PETERS CO., PHOTO-LITHO., WASHINGTON, D. C.

UNITED STATES PATENT OFFICE.

JOHN M. WEST, OF BOSTON, MASSACHUSETTS.

CULINARY APPARATUS.

SPECIFICATION forming part of Letters Patent No. 600,818, dated March 15, 1898.

Application filed May 26, 1897. Serial No. 638,229. (No model.)

*To all whom it may concern:*

Be it known that I, JOHN M. WEST, of Boston, county of Suffolk, State of Massachusetts, have invented an Improvement in Culinary Apparatus, of which the following description, in connection with the accompanying drawings, is a specification, like letters and numerals on the drawings representing like parts.

This invention has for its object the production of an improved apparatus for making coffee or similar beverages, whereby the presence of grounds or leaves is prevented and the solid material maintained in better condition for the thorough action of the cooperating liquid thereon, means being provided for preventing the liquid from boiling over the top of the pot when it is desired to place the same upon the stove or other heater.

The beverage may be prepared by the employment of my invention either by boiling the liquid in the pot or by pouring boiling or hot liquid thereinto to percolate through the solid material.

Figure 1 is a vertical sectional view of an apparatus embodying one form of my invention, the parts being shown in position ready for use. Fig. 2 is a top or plan view of the removable holder for the solid material with its perforated or foraminous top in place, and Fig. 3 is a plan view of one convenient form of coupling or connection between the body of the holder and the holder proper.

The pot A, having a spout or nose A' and handle $A^2$, may be of any well-known or suitable construction, it having, as herein shown, a lid $A^3$, hinged at $A^4$ and provided on its under side with a downturned flange $a$; but any other suitable form of lid may be used instead.

A removable holder for the tea, coffee, or solid basis of the beverage is herein shown as comprising a supporting-body portion $b$ and a depending foraminous holder proper, $c$, detachably connected therewith. The supporting-body $b$ has its upper edge outturned to form a lip 12, adapted to rest upon and be sustained by the top of the pot when the body is inserted in the pot, as shown in Fig. 1.

I have herein shown the holder $c$ for the solid material as a foraminous bag hanging below the body $b$ and connected therewith by a detachable coupling, shown as an expansible ring $c^\times$, adapted to grasp the exterior of the mouth of the holder $c$ and press it into an annular depression $b^2$, formed in a downturned flange $b'$ on the supporting-body $b$. Between the depression $b^2$ and the body the said flange is preferably contracted in diameter or made frusto-conical, as at $b^\times$, for greater convenience in attaching the holder to the body. At such times the expansible ring is slipped up into dotted-line position, Fig. 1, and the edges of the mouth of the holder are then inserted easily between the ring and the lower portion of the flange. As the ring is thereafter drawn down over the material of the holder and into the retaining depression $b^2$ the said material will be drawn closely about and retained on the flange $b'$. By overlapping the ends of the ring and bending them outwardly, as at 5, (see Fig. 3,) the ring can be readily expanded by pressing the ends together.

The holder $c$ may be made of any suitable material which will permit free circulation therethrough of the liquid portion of the beverage, while preventing any escape therefrom of the solid contents.

After the solid material has been placed in the holder $c$ I prefer to close the supporting-body $b$ by a perforated cover $b^3$, adapted to rest on the bottom $b^4$ of the said body, the cover having a depending lip or flange $b^5$ to enter snugly the opening in the body, as clearly shown in Fig. 1. The periphery of the cover is shown as notched at 8, Fig. 2, to pass by suitable lugs or ears $d$, secured to the inner wall of the body $b$, whereby partial rotation of the cover after it is in place will lock it in position.

The body of the holder is provided with a suitable handle or bail $b^6$ to remove it and the attached holder proper, $c$, from the pot.

When the pot-lid $A^3$ is shut, the flange $a$ thereon enters the top of the body $b$ and acts as a tight closure.

In using the apparatus, after a suitable quantity of the solid material has been placed in the holder $c$ and the latter, with its supporting-body, is inserted in the pot, hot or boiling water or other liquid may be poured into the pot through the holder, thus passing through the solid material to extract the essential properties therefrom in that manner without further boiling, or the pot when suitably filled with the liquid may be placed on a stove or other heater and brought to a boil. Before the latter course is taken, however, it will be understood that the cover $b^3$ is applied to prevent boiling over of the liquid contents of the pot or the ejection of any of the solid contents of the holder $c$. After the solid basis of the beverage has been subjected to the action of the liquid for a suitable length of time the supporting-body and its attached holder can be removed bodily from the pot, leaving the clear liquid therein entirely free from grounds or other solid matter. The foraminous holder thus acts not only as a strainer for the beverage, but it also supports the solid basis thereof in such a manner that the liquid may have complete and thorough access thereto.

Having fully described my invention, what I claim as new, and desire to secure by Letters Patent, is—

In an apparatus of the class described, a removable holder comprising an annular supporting-body having a downturned flange connected therewith by a frusto-conical portion, a detachable flexible holder for the solid material, adapted at its upper end to embrace and be freely suspended from and below said flange, and an expansible ring to connect said holder and flange, the ring when not in use contracting and surrounding said conical portion of the body, whereby the upper end of the holder may be readily applied to the flange, substantially as described.

In testimony whereof I have signed my name to this specification in the presence of two subscribing witnesses.

JOHN M. WEST.

Witnesses:
JOHN C. EDWARDS,
AUGUSTA E. DEAN.